United States Patent [19]

Hoeffken

[11] Patent Number: 6,033,454
[45] Date of Patent: Mar. 7, 2000

[54] AIR FILTER ASSEMBLY

[75] Inventor: Russell W. Hoeffken, Belleville, Ill.

[73] Assignee: AAF International, Louisville, Ky.

[21] Appl. No.: 09/114,465

[22] Filed: Jul. 13, 1998

[51] Int. Cl.[7] .................................................. B01D 46/10
[52] U.S. Cl. ................. 55/494; 55/495; 55/501; 55/511; 55/DIG. 5; 55/DIG. 31
[58] Field of Search ......................... 55/501, 511, DIG. 5, 55/DIG. 31, 494, 495

[56] References Cited

U.S. PATENT DOCUMENTS

| | | |
|---|---|---|
| 3,023,839 | 3/1962 | Best . |
| 3,862,903 | 1/1975 | Getzin ....................................... 55/501 |
| 3,938,973 | 2/1976 | Kershaw . |
| 3,970,440 | 7/1976 | Copenhafer et al. . |
| 4,086,071 | 4/1978 | Champlin . |
| 4,105,423 | 8/1978 | Latakas et al. . |
| 4,210,067 | 7/1980 | Evans . |
| 4,277,267 | 7/1981 | Posner . |
| 4,372,763 | 2/1983 | Champlin et al. ......................... 55/501 |
| 4,420,315 | 12/1983 | Kershaw . |
| 4,464,187 | 8/1984 | Kershaw . |
| 4,629,482 | 12/1986 | Davis . |
| 5,810,898 | 9/1998 | Miller ......................................... 55/501 |

*Primary Examiner*—David A. Simmons
*Assistant Examiner*—Minh-Chau T. Pham
*Attorney, Agent, or Firm*—Polster, Lieder, Woodruff & Lucchesi, L.C.

[57] ABSTRACT

An air filter has a generally rectangular frame having surfaces defining generally a plane, and a pair of parallel side rails and a pair of parallel end rails along outer edges of the plane-defining surfaces, the rails flaring outboardly at an obtuse angle from the plane when the frame is unconfined, one of the rails at each corner of the rectangular frame being provided with tabs, and the other, contiguous of the rails at the corner having an open end into which the tab extends. The tabs have an angled outer surface and are of a length compared with the height of the open end to be held against movement clear of the open end in every position of the rails when the frame is assembled, to limit the outward flare of the rails and to ensure that the corners of the rails are substantially closed in every position of the rails.

8 Claims, 3 Drawing Sheets

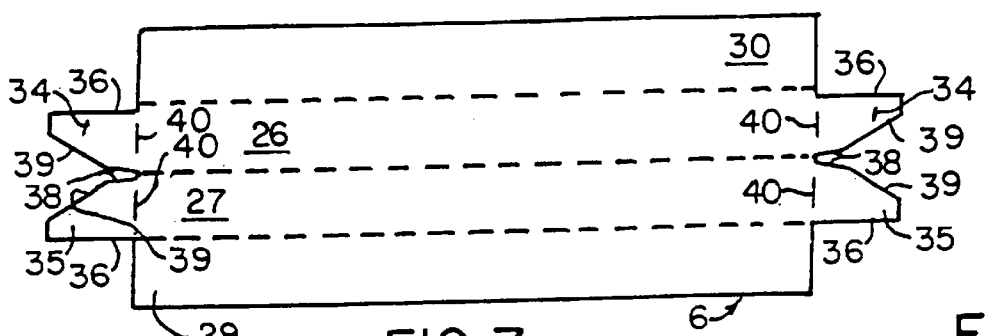
FIG. 7  FIG. 8
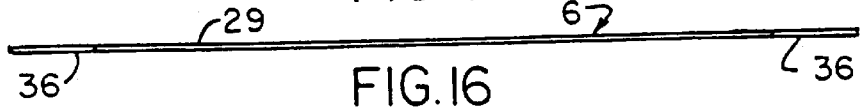
FIG. 16
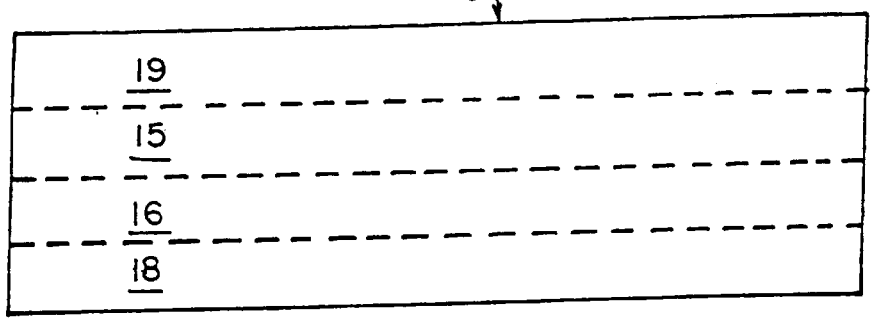
FIG. 9  FIG. 10
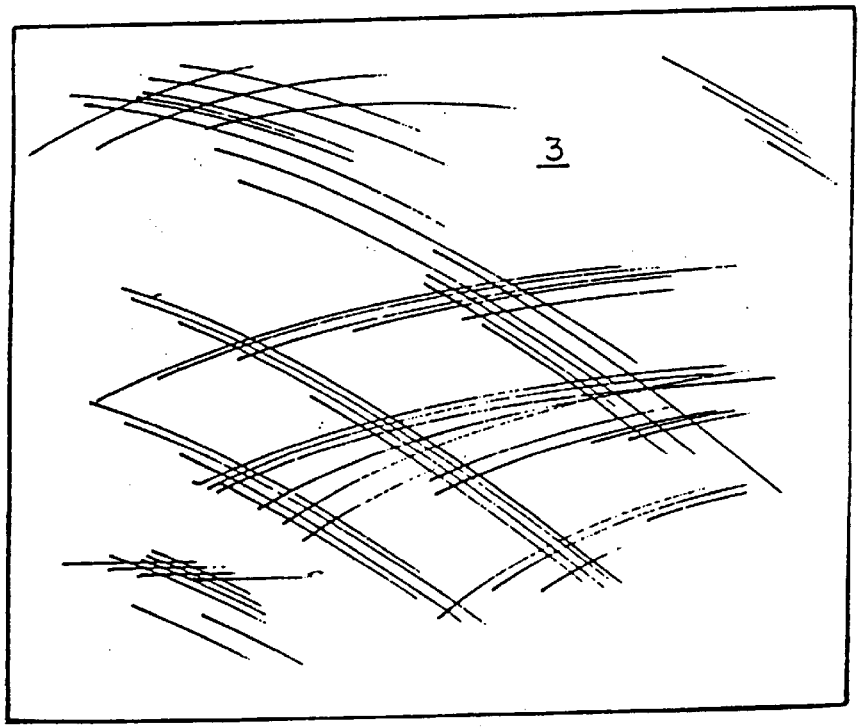 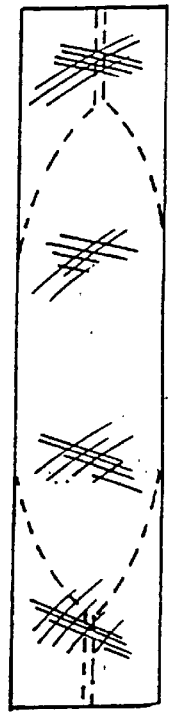
FIG. 11  FIG. 12

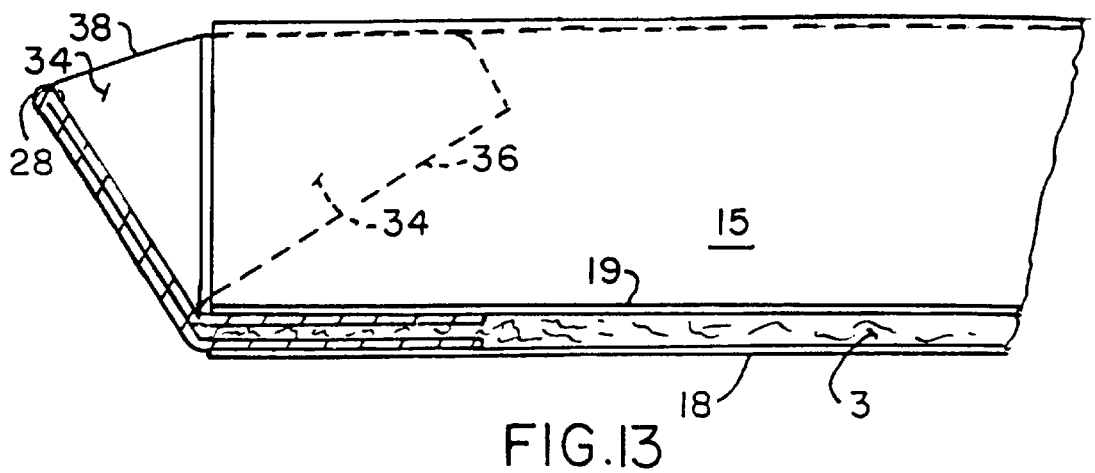
FIG.13
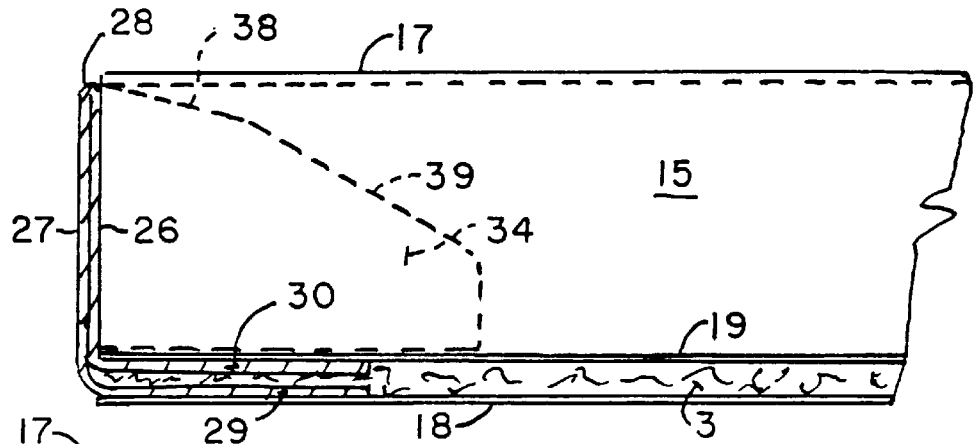
FIG.14
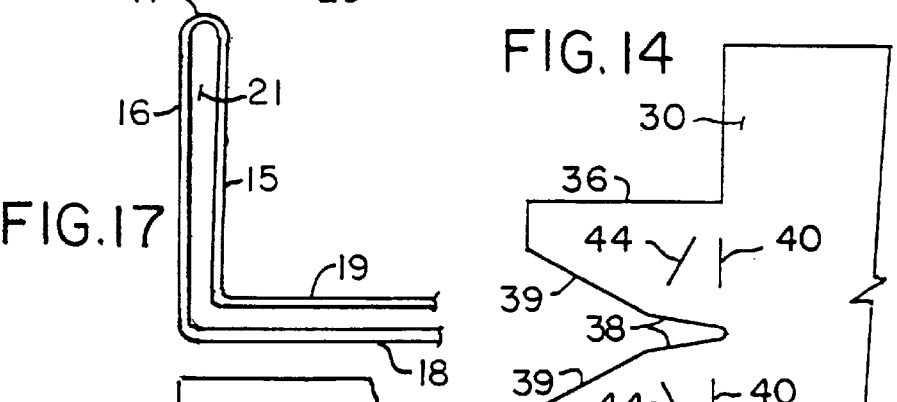
FIG.17
FIG.15
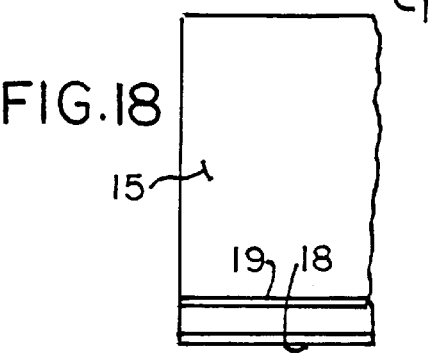
FIG.18

AIR FILTER ASSEMBLY

BACKGROUND OF THE INVENTION

Fibrous glass air filter units for use in forced air heating and air conditioning installations have been the subject of many patents. The need for compact, nestable filters has been recognized, see for example Best, U.S. Pat. No. 3,023,839 and Latakas, et al. U.S. Pat. No. 4,105,423. In patent '839, V openings between ends of straight fiberboard side sections are blocked by paper tape, although it is suggested that even without the tape, the openings are blocked to some degree by a bridging portion of a compressed web of fibrous glass. However, when the tape is used, it will interfere with the inward flexing of the side rails of the frame of the filter, and if it is not used, there is bound to be leakage at the corners. Champlin, No. 4,086,071 suggests a construction in which frame members fold inwardly to conserve space. Champlin does suggest the use of tabs 22 to effect interconnection at the corners of the frame. However, when the frame members are folded in, the flaps 22 are disengaged from the adjacent frame member, and must be reengaged when the frame members are erected.

One of the objects of this invention is to provide an air filter with a frame that is flared outwardly from the filter medium, to permit nesting of filters for shipment and storage, with tabs that remain engaged with contiguous frame members.

Other objects will become apparent to those skilled in the art in the light of the following description and accompanying drawings.

BRIEF SUMMARY OF THE INVENTION

In accordance with this invention, generally stated, a compact, nestable air filter is provided which, in the embodiment described, has a generally rectangular frame within which a batt of glass fiber filter medium is mounted. The frame has surfaces (feet) between which edges of the filter batt are mounted. Edges of these surfaces define generally planes parallel to one another. The frame also comprises a pair of parallel side rails and a pair of parallel end rails integral with and extending along outer edges of the plane-defining surfaces. The rails flare outwardly at an obtuse angle from the filter medium-engaging plane-defining surfaces when the frame is unconfined. In the embodiment shown, one pair of the rails has open ends and the other pair of rails has flexible tabs extending slidably into the open ends. The tabs are sufficiently long as compared with the height of the open ends to ensure that the tabs do not leave the open ends of the rails into which the tabs extend. In the preferred embodiment, the tabs have a compound angle along their outer edges, and are either bowed or scored to hold the rails in outwardly flared position until the rails are moved by external forces into a position more nearly perpendicular to the plane-defining surfaces. In any event, the construction of the tabs is such as to provide a positive barrier to the passage of air at the corners of the frame in any position of the rails.

BRIEF DESCRIPTION OF THE SEVERAL VIEWS OF THE DRAWINGS

In the drawings,

FIG. 7 is a top plan view of a paper board blank forming end rails of the filter shown in FIG. 1;

FIG. 8 is a view in end elevation of the blank shown in FIG. 7;

FIG. 9 is a top plan view of a blank from which side rails of the filter shown in FIG. 1 are made;

FIG. 10 is a view in end elevation of the blank of FIG. 9;

FIG. 11 is a top plan view of a batt of filter medium before it is mounted in a frame;

FIG. 12 is an edge view of the filter batt shown in FIG. 11, the configuration of the batt after mounting being shown in dotted lines;

FIG. 13 is a fragmentary, enlarged, sectional view showing an end rail in flared position with a tab inserted in an end of a side rail;

FIG. 14 is a sectional view corresponding to that of FIG. 13, showing the end rail in a perpendicular position;

FIG. 15 is a fragmentary top plan view of an end rail blank showing score lines around which tabs are bent;

FIG. 16 is a view in side elevation of the blank shown in FIG. 7;.

FIG. 17 is a fragmentary side view of the side rail shown in FIG. 14; and

FIG. 18 is a fragmentary end view of a side rail, showing an open end thereof.

DETAILED DESCRIPTION OF THE INVENTION

Figure 1:
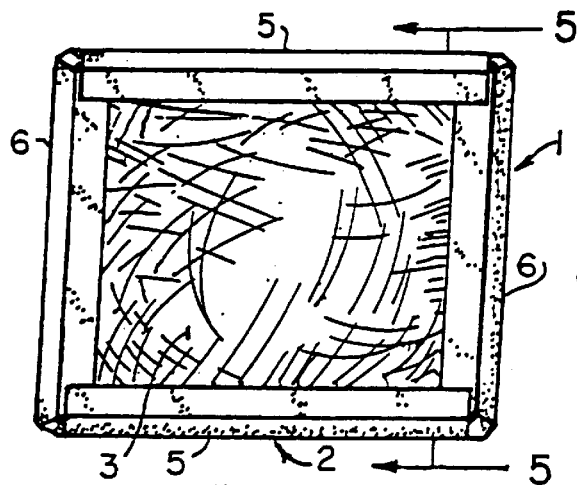
FIG. 1 is a top plan view of one embodiment of filter of this invention.
Figure 2:
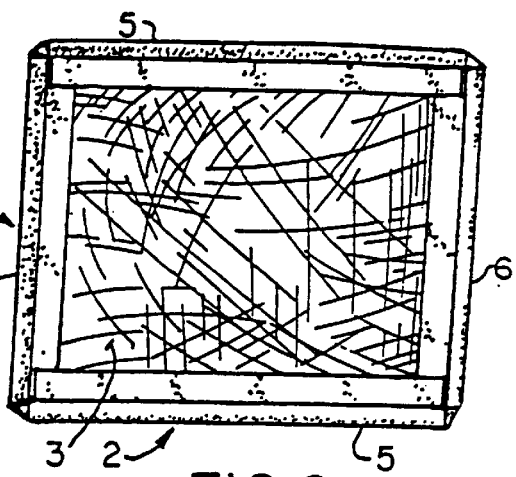
FIG. 2 is a bottom plan view.
Figure 3:
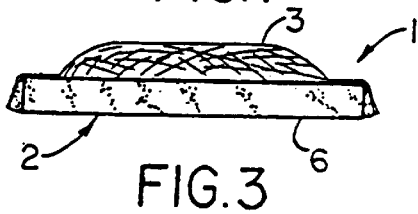
FIG. 3 is a view in end elevation of the device as shown in FIG. 1.
Figure 4:
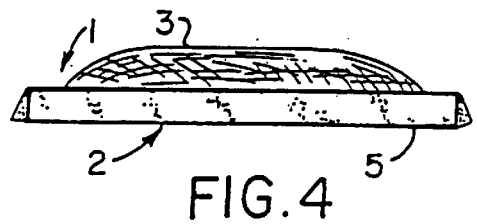
FIG. 4 is a view in side elevation of the filter shown in FIG. 1.

Referring now to FIGS. 1 through 6, reference numeral 1 indicates the completed filter, consisting essentially of a frame 2 and a batt of filter medium 3 mounted in the frame 2.

Figure 5:
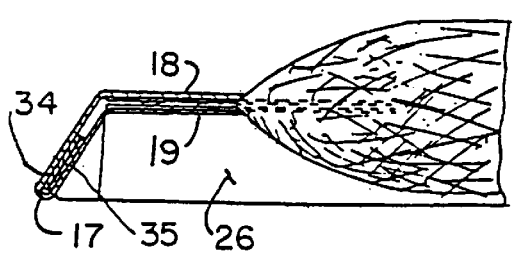
FIG. 5 is a sectional view taken along the line 5—5 of FIG. 1.
Figure 6:
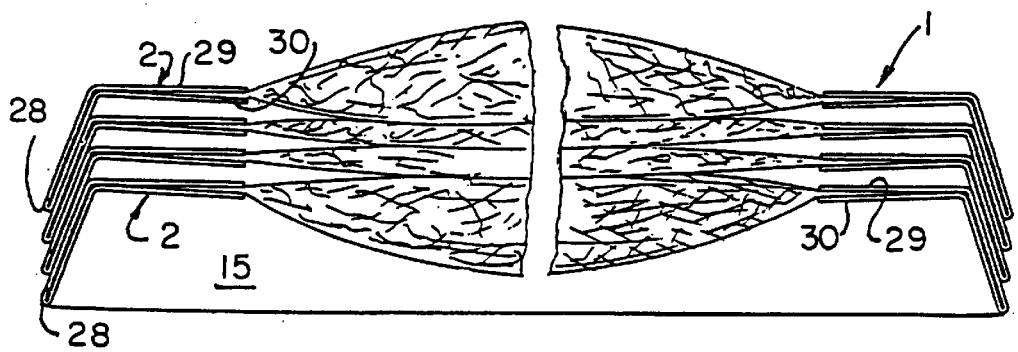
FIG. 6 is a view with a side rail removed for simplicity of illustration, showing four filters of this invention stacked.

The frame 2 is made up of side rails 5 and end rails 6. In this embodiment, each of the side rails 5 is made of a rectangular blank of paperboard folded to form a side rail inner wall 15, an outer wall 16, a folded outer edge 17, an outer wall foot 18 and an inner wall foot 19. The rectangular blank is shown in FIG. 9, and the various parts when assembled are shown in FIG. 5. The side rail inner wall 15 and outer wall 16 define, with the folded outer edge 17 and the outer wall foot 18, an opening 21 shown somewhat exageratedly in FIG. 17.

Each of the end rails 6 is also made of a blank of paperboard, folded to form an end rail inner wall 26, an outer wall 27, a folded outer edge 28, an outer wall foot 29 and an inner wall foot 30. In addition, the blank is cut to form an end rail inner wall tab 34 and an end rail outer wall tab 35 at each end of the blank. Each of the tabs has an inner edge 36 and an outer edge which, in this preferred embodiment, has a straight reach 38 and an angled reach 39. The straight reach is in fact angled slightly from the centerline of the folded outer edge 28. For example, in a one inch tab, if the straight reach is ⅜ of an inch long, as measured along the inner edge 36, its inner end is on a radius of 1/32 of an inch on the centerline of the folded edge, and its outer end is 1/16 of an inch below the centerline of the folded outer edge. The outer end of the angled reach is 7/16 of an inch below the centerline of the folded outer edge 28 in a distance of ⅝ of an inch measured along the lower edge 36.

The tabs 34 and 35, when the blank is folded, are complementary, and are positioned side by side. They are somewhat flexible, their bendability being enhanced by score lines 40. In the preferred embodiment, a second score line 44 is provided on each tab part, oriented in a direction between the comer of the inner edges 36 and the feet 29 and 30, and the arris between the straight reach 38 and the angled reach 39, as shown in FIG. 15. While this scoring arrangement is preferred, because the second score line helps define the limit, hence uniformity, of flair, the tabs can be made sufficiently flexible to bow to permit the outward flare of the side rails. Both the side rails and the end rails flare in their unconfined condition, the tabs generally being formed so that the flare is about 110° from the plane defined by the feet of the inner wall of the side and end rails. The angled reach of the upper edge of the tabs can, of course, be made to accommodate any degree of flare. In any event, the length of the tabs is sufficiently greater than the height of the opening 21 so that, as can be seen in FIGS. 13 and 14, the tabs remain in the space between the inner and outer walls 15 and 16 of the side rails. As a practical matter, the feet of the inner walls of the rails may slope inboardly from the inner walls of the rails to the free edges of the feet, but the free edges of the feet will come close enough to defining a plane to provide a reference for the flare angle of the rails.

The filter medium 3 is mounted between the inner and outer feet all the way around the frame, and is held in place in any suitable way, preferably with staples, but, as disclosed in U.S. Pat. No. 3,970,440, for example, other means, such as adhesive or other fasteners, can be used.

In making the filter, the end rail blanks, as shown in FIG. 7, are folded over the line extending between the notches defined by the straight reaches 38 at the roots of the tabs, the outer wall 27 and its foot 29 being in practice slightly wider than the inner wall 26 and inner foot 30, to compensate for the fact that they have to reach around the inner wall and foot. Generally, the tabs 34 and 35 are positioned to be caged within the ends of the side rails when and as the side rails are similarly folded, but in any event, they are positioned before the side and end rails are fastened together. The filter batt, which has been laid with its edges on the upper surface of the outer wall feet before the inner wall feet are folded over them, is then fastened between the feet, the side rails and end rails joined, as by staples which can also be used to fasten the filter batt, and the filter is completed.

When the filter is confined within an air conditioner or heating duct or other receiver, it is generally slipped between facing channels, in which condition, an external force is applied to the rails, moving them toward the perpendicular with respect to the reference plane. For shipping or storing, the flared rails permit the nesting of the filters, thus conserving space as has frequently been observed in the prior art.

Although the terms "end rails" and "side rails" have been used to describe the rails with which tabs are integral and those which receive the tabs, respectively, it will be understood that this is a matter of convenience. The end rails can be the receiving rails and the side rails the ones equipped with tabs. All of the rails can be equipped with tabs at one end and openings at the other. To protect or reinforce the filter medium, a sheet of backing, with apertures, if the sheet is to be left in place, or with perforations to permit its removal, can be provided, in the embodiment shown, fastened to the outer surfaces of the outer walls of the rails. The entire frame can be made of one blank, with or without an integral backing sheet.

As has been indicated, the tabs can be made with a single angled outer edge, but the dual angle has advantages in blocking air flow at the corners when the rails are not fully moved to the perpendicular position in use. The blank or blanks can be made of material different from paperboard, such as plastic or metal, in which case the tabs must be flexible or ductile enough to perform their functions. The frame has been described as rectangular, and that configuration, which includes square, is the one that is used conventionally. However, frames of different configurations will benefit from the tab arrangement of the present invention. A pentagonal, hexagonal octagonal or other polygonal frame, or even a frame that is substantially round when its walls are compressed, or an assymetrical frame, enclosed in an outer receiver that is hinged or divided to receive the non-rectangular frame, can be made in accordance with this invention to provide flaring rails and tabs at their ends that remain caged within the open ends of contiguous rails. Although it is not preferred, because of the flimsiness of the construction and less efficient blockage of the flow of air at the comers, the rails can be made of a single ply, the side rails being slotted inboard of their ends and the end rails provided with tabs of a length compared with the height of the slot to preclude their being withdrawn after the rails are assembled. In that construction, a separate frame-like other foot part, preferably in one piece, is used to clamp the filter medium batt between it and the single ply foot and to strenghthen the joints between the rails. Numerous other variations of the construction of the filter of this invention, within the scope of the appended claims, will occur to those skilled in the art in the light of the foregoing disclosure.

I claim:

1. A compact, nestable air filter comprising a generally rectangular fame having surfaces defining generally a plane, and a pair of spaced parllel side rails and a pair of spaced parallel end rails along outer edges of said plane-defining surfaces, said rails flaring outboardly at an obtuse angle from said plane-defining surfaces when said frame is unconfined, one of said rails at each corner of said rectangular frame being provide with tab means, and the other, contiguous of said rails at said corner having an open end into which said tab means extends, said tab means having a compound angled contoured outer surface including first, sharply angled section and a second, straight edge section engaging an end opening-defining inner surface of said other rail along a free edge of said other rail whereby said rails are held in flared position along said first edge section when said frame is unconfined and permitted to be moved to a position generally perpendicular to said plane-defining surfaces along said second edge section, said tab being of a length compared with the height of said open end to be held against movement clear of said open end in every position of said rails when said frame is assembled, to limit the outward flare of said rails and to ensure that the corners of said rails are substantially closed in every position of said rails.

2. The filter of claim 1 wherein both pairs of rails comprise two feet spaced from one another through at least a portion of their extent to an inboard edge, and a riser having inner and outer side walls integral with said feet and connected to one another at an outer margin, said rail riser walls of one of said pairs defining an opening at each end of the rails and said rail riser walls of the other of said pairs of rails being formed with tabs at each end of said other of said pairs of rails, said tabs at each end being integral with said riser walls, and lying against one another to be of the combined thickness of said walls, filtration material having edge portions sandwiched between said feet, and means for holding said filtration material in place between said feet.

3. The filter of claim 2 wherein the rails are formed in pairs, and the means for holding said filtration material in place also serves to connect said rails at ends of said feet.

4. The filter of claim 1 wherein the said tab means angled outer surface has a double angle, with a straight reach and a more sharply angled reach, said sharply angled reach engaging said inside surface of said open end of said contiguous rail when the rails are in fully flared position.

5. The air filter of claim 1 wherein said rails are paperboard, each side rail having two feet spaced from one another through at least a portion of their extent to an inboard edge, and a riser having inner and outer side walls integral with said feet and connected to one another at an outer margin, said side rail riser walls defining an opening at each end of the rail and each of said end rails having two feet spaced from one another through at least a portion of their extent to an inboard edge, and an end rail riser having inner and outer walls integral with said feet and connected to one another along an outer margin, said tabs being integral with ends of said riser walls, filtration material having edge portions sandwiched between said feet, and means for holding said filtration material in place between said feet and for connecting said side rails and said end rails at ends of said feet.

6. The filter of claim 1 wherein each of the tabs has a score line extending generally in a direction from a corner of an inside edge of the tab to an arris between the straight section and the more sharply angled section.

7. The method of making an air filter comprising forming a plurality of rails each with a foot defining generally a plane and at least one wall extending at an obtuse angle from said plane-defining foot and movable to a position substanitially perpendicular to said plane, successive of said rails having ends that meet, one of said meeting ends having a projecting tab, the next succeeding of said meeting ends having an opening into which said tab extends, forming said tab with an angled outer surface tapering convergently toward its outer end, said tab angled outer end of a rail alone a free edge of said rail, said tab being of a length compared with the height of said opening to ensure that said tab cannot move out of said opening when said rails are assembled, but to permit said rails to move to said obtuse angle, mounting a batt of filter medium on said foot, and assembling said rails with said tabs in said openings.

8. The method of making an air filter having two side rails and two end rails, comprising forming side rail blanks of paperboard, each with an elongated inner wall part, an inner wall foot integral with and extending along the length of said inner wall part, an elongated outer wall part integral with said inner wall part, and an outer foot integral with and extending along the length of said outer wall part; forming end rail blanks each with an elongated inner wall part, an inner wall foot integral with and extending along the length of said inner wall part, an elongated outer wall part integral with said inner wall part, and an outer wall foot integral with said outer walt part, a tab projecting from each of said inner and outer end rail walls, said tab being formed with an compound angled edge having a straight reach from a root of said tab and a more steeply angled reach from the end of said straight reach to a free end of said tab; laying a batt of filter medium on said outer wall feet; folding said end rail blank around a line between said inner and outer walls and aligning said tabs to lie side by side complementarily to define a single compound angled edge; folding said inner end rail wall feet over side edges of said batt; folding said side rail blanks around a line between said inner and outer walls, mounting said tabs to project through an opening defined by said folded inner and outer side walls and within a space between said inner and outer side walls with said angled edge engaging an interior wall defining said space along a free edge of said side wall; folding said side wall inner wall feet over edges of said batt, and fastening said feet with said batt between them and said side and end rails together, said tabs being of a length compared with the height of said open end to be held against movement clear of said open end in every position of said rails.

\* \* \* \* \*